US010774904B1

(12) United States Patent
Hussen et al.

(10) Patent No.: US 10,774,904 B1
(45) Date of Patent: Sep. 15, 2020

(54) TORSIONAL SPRING TENSIONING SYSTEM FOR A POWER TRANSMISSION CHAIN

(71) Applicants: Hasanen Mohammed Hussen, Baghdad (IQ); Mahmoud A. Mashkour, Baghdad (IQ); Salman H. Omran, Baghdad (IQ); Laith Jaafer Habeeb, Baghdad (IQ); Nabeh Natik Alderoubi, Lincoln, NE (US)

(72) Inventors: Hasanen Mohammed Hussen, Baghdad (IQ); Mahmoud A. Mashkour, Baghdad (IQ); Salman H. Omran, Baghdad (IQ); Laith Jaafer Habeeb, Baghdad (IQ); Nabeh Natik Alderoubi, Lincoln, NE (US)

(*) Notice: Subject to any disclaimer, the term of this patent is extended or adjusted under 35 U.S.C. 154(b) by 0 days.

(21) Appl. No.: 16/906,179

(22) Filed: Jun. 19, 2020

Related U.S. Application Data

(63) Continuation of application No. 16/718,925, filed on Dec. 18, 2019.

(51) Int. Cl.
*F16H 7/06* (2006.01)
*F16F 1/16* (2006.01)
*F16H 7/18* (2006.01)
*F16H 7/08* (2006.01)

(52) U.S. Cl.
CPC ............... *F16H 7/06* (2013.01); *F16F 1/16* (2013.01); *F16H 2007/0842* (2013.01); *F16H 2007/185* (2013.01)

(58) Field of Classification Search
CPC .......... F16G 13/18; F16G 13/04; F16G 13/06; F16G 13/20; F16G 13/24

USPC ................................. 474/226, 206
See application file for complete search history.

(56) References Cited

U.S. PATENT DOCUMENTS

| | | | | |
|---|---|---|---|---|
| 580,449 | A * | 4/1897 | Caldwell | F16G 13/06 474/218 |
| 617,716 | A * | 1/1899 | Caldwell | F16G 13/06 474/221 |
| 992,740 | A * | 5/1911 | Taylor | F16G 13/06 474/221 |
| 1,239,232 | A * | 9/1917 | Taylor | F16G 13/06 474/221 |
| 1,939,986 | A * | 12/1933 | Klaucke | F16G 13/06 474/221 |
| 1,947,421 | A * | 2/1934 | Mize | F16G 13/06 474/221 |
| 2,130,063 | A * | 9/1938 | Bryant | F16G 13/06 474/221 |

(Continued)

*Primary Examiner* — Henry Y Liu
(74) *Attorney, Agent, or Firm* — Nasr Patent Law LLC; Faisal K. Abou-Nasr (57) ABSTRACT

A torsional spring tensioning system for a power transmission chain is disclosed. In embodiments, the torsional spring tensioning system includes at least one torsion spring coupled to a pair of links (e.g., an inner link and an outer link) of the power transmission chain. The torsional spring includes a first spring leg and a second spring leg flexibly coupled by at least one winding. The winding is coupled to a pivot that connects the inner and outer links together. Meanwhile, the first spring leg is coupled to the inner link, and the second spring leg is coupled to the outer link. As a result of this configuration, the torsional spring biases the inner link toward the outer link, or vice versa, to produce/maintain tension in the power transmission chain.

20 Claims, 6 Drawing Sheets

(56) References Cited

U.S. PATENT DOCUMENTS

| | | | | | |
|---|---|---|---|---|---|
| 2,231,380 | A | * | 2/1941 | Belcher | F16G 13/06 474/221 |
| 2,667,792 | A | * | 2/1954 | Bendall | F16G 13/04 474/157 |
| 3,877,688 | A | * | 4/1975 | McCarty | F16G 13/06 267/159 |
| 3,948,114 | A | * | 4/1976 | Koinzan | F16G 13/06 474/101 |
| 5,098,349 | A | * | 3/1992 | Wu | F16G 13/06 474/206 |
| 5,114,384 | A | * | 5/1992 | Tsuyama | F16G 13/04 474/212 |
| 5,645,503 | A | * | 7/1997 | Okuda | F16G 13/04 474/214 |
| 5,938,553 | A | * | 8/1999 | Ishida | F16G 13/06 474/208 |
| 6,308,510 | B1 | * | 10/2001 | Christmas | F16G 13/18 59/78 |
| 7,452,295 | B2 | * | 11/2008 | Morishige | F16G 13/04 474/206 |
| 8,002,658 | B2 | * | 8/2011 | Morishige | F16G 13/24 474/206 |
| 9,463,958 | B2 | * | 10/2016 | Christmas | A01K 1/064 |
| 9,541,160 | B2 | * | 1/2017 | Kranz | F16G 13/20 |
| 2005/0049099 | A1 | * | 3/2005 | Morishige | F16G 13/18 474/212 |
| 2009/0124445 | A1 | * | 5/2009 | Morishige | F16G 13/24 474/208 |
| 2012/0311990 | A1 | * | 12/2012 | Dunham | H02G 11/006 59/93 |
| 2014/0329632 | A1 | * | 11/2014 | Kranz | F16G 13/20 474/206 |

\* cited by examiner

TORSIONAL SPRING TENSIONING SYSTEM FOR A POWER TRANSMISSION CHAIN

CROSS-REFERENCE TO RELATED APPLICATIONS

The present application is a continuation of U.S. application Ser. No. 16/718,925, filed Dec. 18, 2019, and titled "TORSIONAL SPRING TENSIONING SYSTEM FOR A POWER TRANSMISSION CHAIN," which is incorporated herein by reference in its entirety.

TECHNICAL FIELD

The present invention generally relates to power transmission chains, and, more particularly, to tensioning systems for power transmission chains.

BACKGROUND

A power transmission chain may loosen over time due to stretching of chain links or other components. This may be caused by normal operating conditions (e.g., due to typical wear and crack) and/or as a result of an external stress (e.g., due to excessive torque, jamming, temperature changes, etc.). However, a power transmission chain should maintain proper tension to prevent failure, such as engagement failure and/or excessive noise from vibrating chain links or teeth.

There are numerous devices that can be used to maintain tension in a power transmission chain system. Depending on the functionality of the system, tensioning devices may include, but are not limited to, hydraulic, pneumatic, and/or gravity-based tensioning devices. Many of these tensioners are externally attached to the system to keep it in working condition. This requires the addition of external add-on devices that tend to increase size and complexity of the system.

To avoid increased size and complexity of a power transmission chain system, there is a need for tensioning systems that can be integrated within the power transmission chain itself, rather than requiring the addition of external add-on devices.

SUMMARY

A torsional spring tensioning system for a power transmission chain is disclosed. The torsional spring tensioning system is integrated within the power transmission chain itself and can therefore be implemented without increasing the size or complexity of a power transmission chain system.

In embodiments, the torsional spring tensioning system includes at least one torsional spring coupled to a pair of successive links (e.g., an outer link and inner link) of the power transmission chain. The torsional spring includes a first spring leg and a second spring leg flexibly coupled by at least one winding. The winding is coupled to a pivot that connects the inner and outer links together. Meanwhile, the first spring leg is coupled to the inner link, and the second spring leg is coupled to the outer link. As a result of this configuration, the torsional spring biases the inner link toward the outer link, or vice versa, to produce or maintain tension in the power transmission chain.

In some embodiments, the torsional spring tensioning system may include a plurality of torsional springs distributed among successive pairs of links within the power transmission chain. For example, torsional springs may be disposed at each pivot, every other pivot, or less frequently along the power transmission chain. Utilizing a plurality of distributed torsional springs may help to produce or maintain tension more uniformly throughout the power transmission chain.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims.

DETAILED DESCRIPTION

Reference will now be made in detail to the subject matter disclosed, which is illustrated in the accompanying drawings. Referring generally to FIGS. 1 through 6, a torsional spring tensioning system for a power transmission chain is disclosed.

As noted above, many tensioning devices are externally attached to a power transmission chain system to keep it in working condition. This requires the addition of external add-on devices that tend to increase size and complexity of the system. To avoid increased size and complexity of a power transmission chain system, there is a need for tensioning systems that can be integrated within the power transmission chain itself, rather than requiring the addition of external add-on devices.

The torsional spring tensioning system described in this disclosure is integrated within the power transmission chain itself and can therefore be implemented without increasing the size or complexity of a power transmission chain system. In addition to its reduced footprint, some advantages of the torsional spring tensioning system include, but are not limited to, its simplicity, low manufacturing cost, low maintenance cost, and ease of installation and replacement.

In embodiments, the torsional spring tensioning system includes one or more torsional springs (e.g., pivot arm torsional springs) integrated within the power transmission chain. For example, a torsional spring may be pivoted at a pin that connects a successive pair of links. The spring legs (i.e., the free ends) of the torsional spring may be mounted to links themselves. As a result, the torsional spring biases the links toward each other to some degree, thus maintaining tension in the power transmission chain. The number of torsional springs and their physical characteristics (e.g., size, nominal angle, strength, flexibility, etc.) can be adjusted to achieve the required tension.

Figure 1:
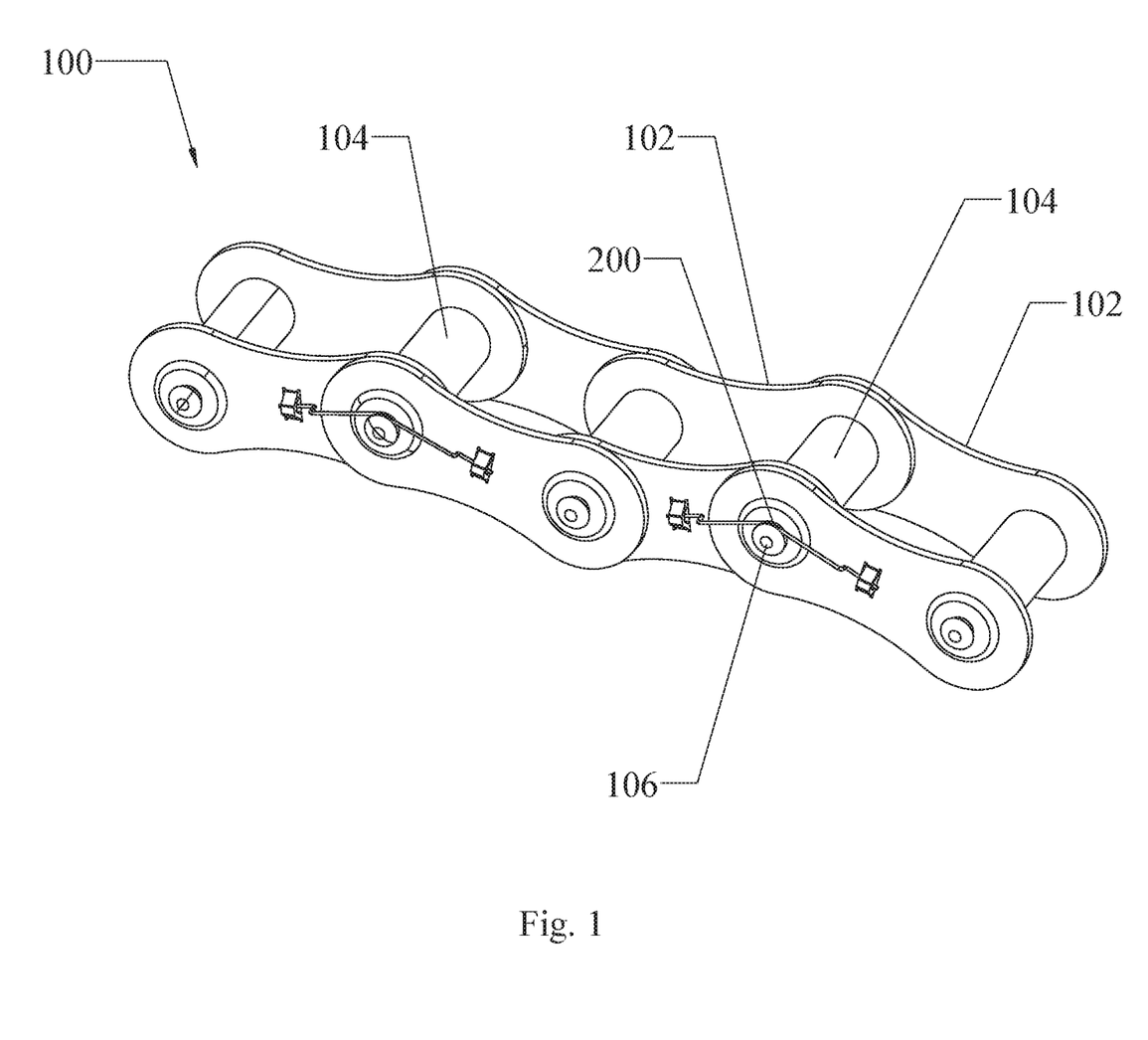
FIG. 1 is a perspective view of a power transmission chain that includes a torsional spring tensioning system, in accordance with an example embodiment of the present disclosure.
Figure 2:
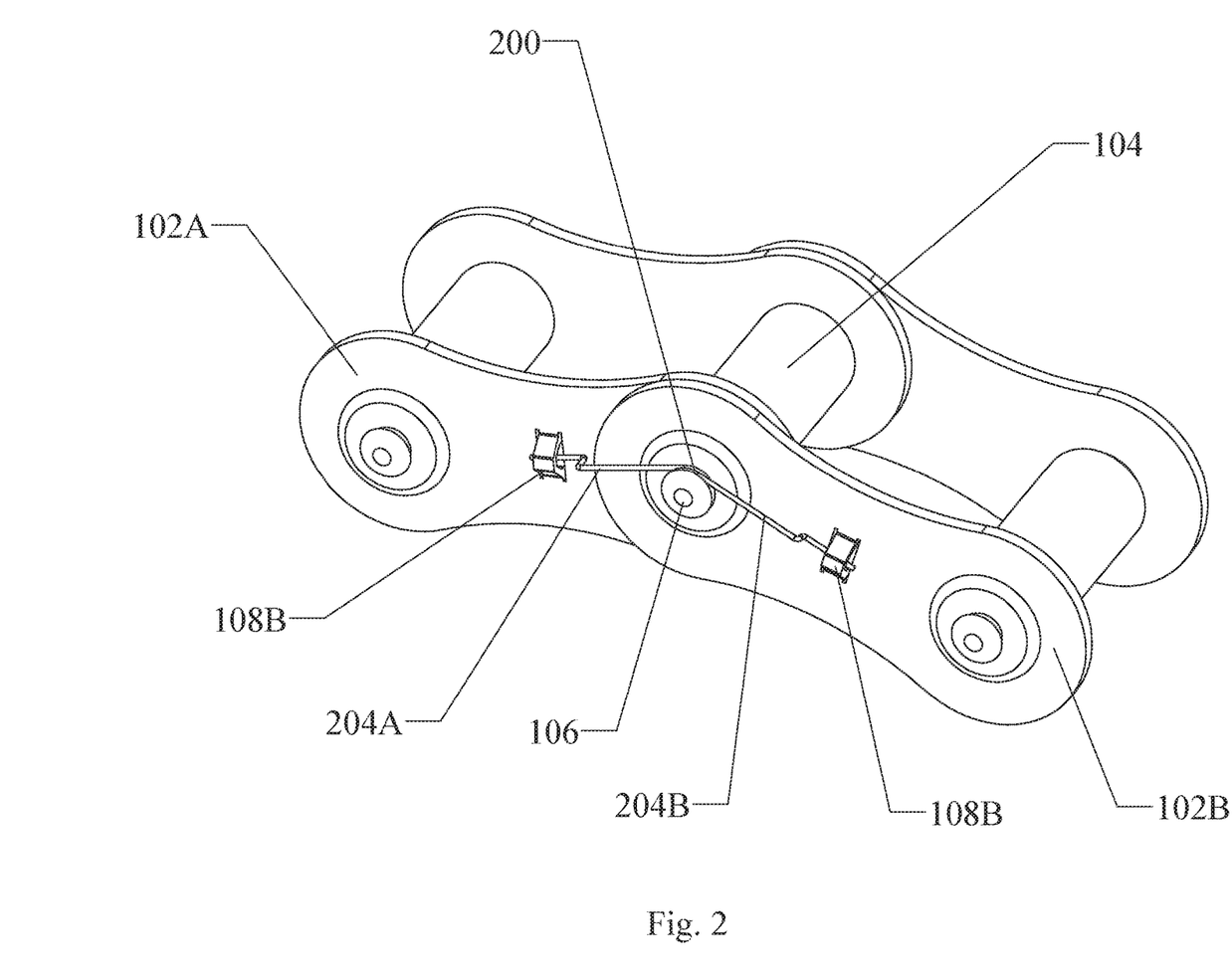
FIG. 2 is a perspective view of a pair of links of a power transmission chain that includes a torsional spring tensioning system, in accordance with an example embodiment of the present disclosure.

FIGS. 1 through 6 illustrate various embodiments of a power transmission chain 100 that includes a torsional spring tensioning system implemented by one or more torsional springs 200 integrated within the power transmission chain 100. In embodiments, at least one torsional spring 200 is coupled to a pair of links 102 of the power transmission chain 100. For example, as shown in FIG. 2, the torsional spring 200 is coupled to an inner link 102A and an outer link 102B of the power transmission chain 100.

Figure 6:
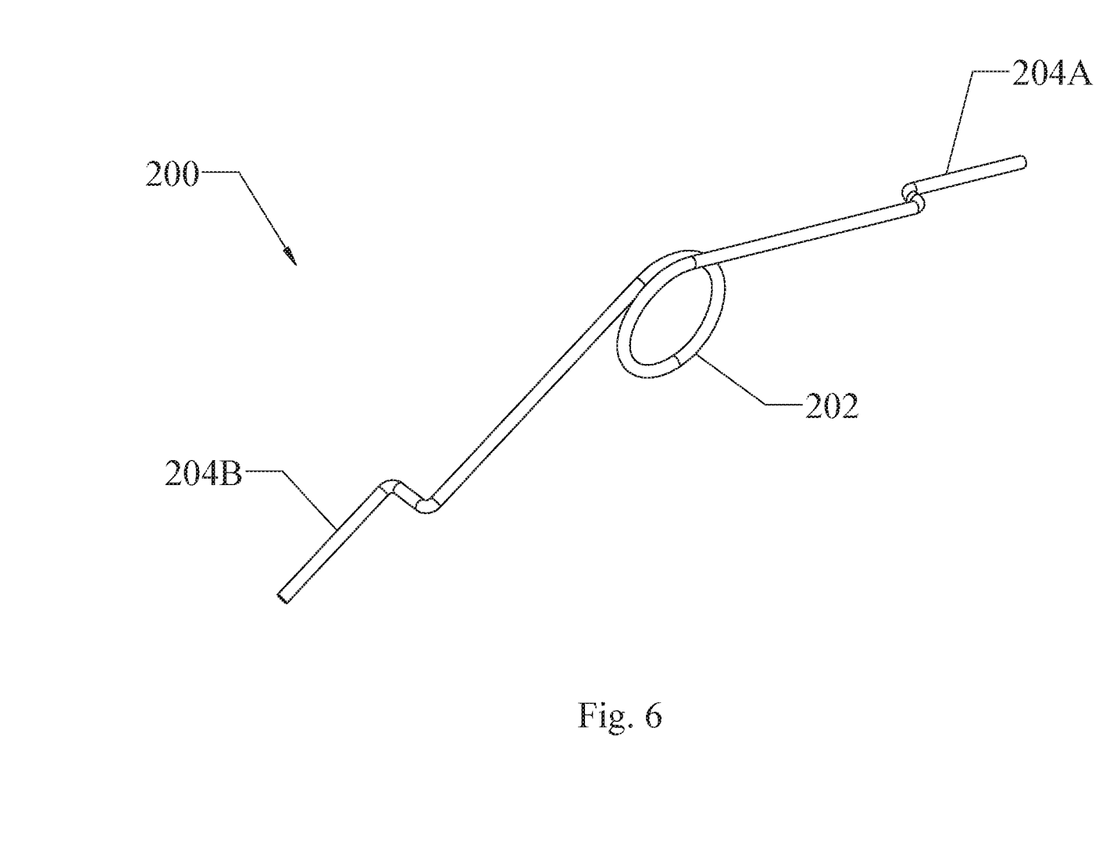
FIG. 6 is a perspective view of a torsional spring of a torsional spring tensioning system, in accordance with an example embodiment of the present disclosure.

As shown in FIG. 6, the torsional spring 200 includes a first spring leg 204A and a second spring leg 204B flexibly coupled by at least one winding 202. In embodiments, the spring legs 204 and the winding 202 are all part of a common structure. For example, the torsional spring 200 may be manufactured from a metal or metal alloy that is shaped (e.g., extruded, cold forming, and/or hot forming) to form one or more windings 202 and the spring legs 204 extending therefrom.

Referring again to FIG. 2, the winding 202 is coupled to a pivot 106 (e.g., pin 106) that connects the pair of links 102 together. For example, the pin 106 may extend through the winding 202 of the torsion spring 200 and may be configured to hold the inner link 102A, the outer link 102B, and the torsion spring 200 together. In some embodiments, the pin 106 is surrounded by a bush and roller 104. The rollers 104 (sometimes referred to as "teeth") allow the chain 100 to be actuated by sprocket, gear, or any other actuator with moving teeth or hooks configured to engage the rollers 104 so that the chain is pulled in one direction or another.

The spring legs 204 (i.e., the free ends) of the torsional spring 200 are connected to the links 102 themselves. For example, in the embodiment illustrated in FIG. 2, the first spring leg 204A is coupled to the inner link 102A of the pair, and the second spring leg 204B is coupled to the outer link 102b of the pair. As a result of this configuration, the torsional spring 200 biases the inner link 102A toward the outer link 102B, or vice versa, to produce or maintain tension in the power transmission chain 100.

Figure 3:
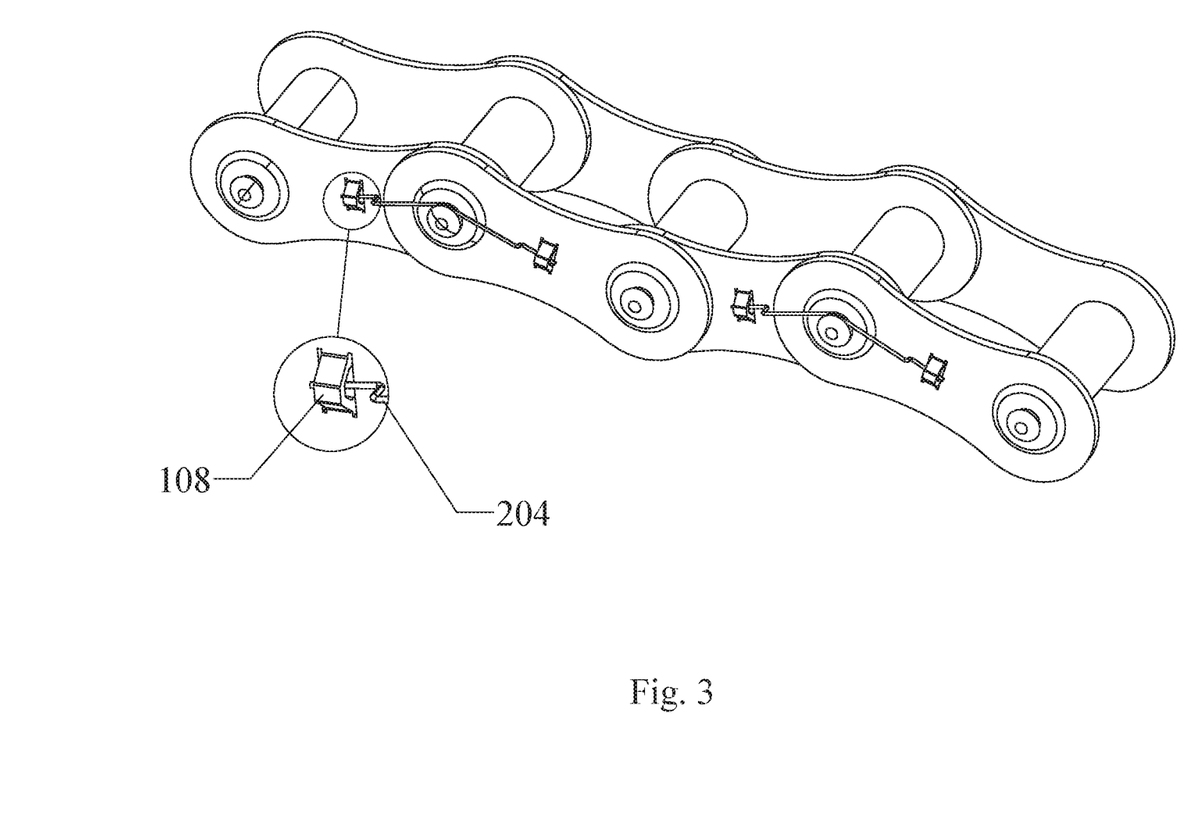
FIG. 3 is a zoomed-in view of a spring leg connection point on a link of a power transmission chain that includes a torsional spring tensioning system, in accordance with an example embodiment of the present disclosure.

In embodiments, the links 102 include connection points 108 (e.g., notches, slots, indentations, projections, openings, holes, or the like) configured to receive end portions (e.g., distal ends) of the spring legs 204. For example, FIG. 3 shows a zoomed-in view of a connection point 108 (e.g., a notch) formed on an outer surface of a link 102 so that a spring leg 204 can coupled to the outer surface of the link 102 at the connection point 108.

As shown in FIG. 2, the inner link 102A may include a first connection point 108A configured to receive an end portion of the first spring leg 204A, and the outer link 102B may include a second connection point 108B configured to receive an end portion of the second spring leg 204B. In some embodiments, the connection points 108 are located at or past the midpoints of successive links 102 so that the torsional spring 200 can exert more torque on the links 102. For example, the first connection point 108A may be located at or past a midpoint of the inner link 102A, and the second connection point 108B may be located at or past a midpoint of the outer link 102B.

In some embodiments, the spring legs 204 include bends based on the surface profiles of the links 102. For example, the first spring leg 204A may include at least one bend between the winding 202 and an end portion of the first spring leg 204A, where the bend (or bends) are based on surface height or depth differences between the pivot 106 and the first connection point 108A on the inner link 102A. Similarly, the second spring leg 204B may include at least one bend between the winding 202 and an end portion of the second spring leg 204B, where the bend (or bends) are based on surface height or depth differences between the pivot 106 and the second connection point 108B on the inner link 102B.

Figure 4:
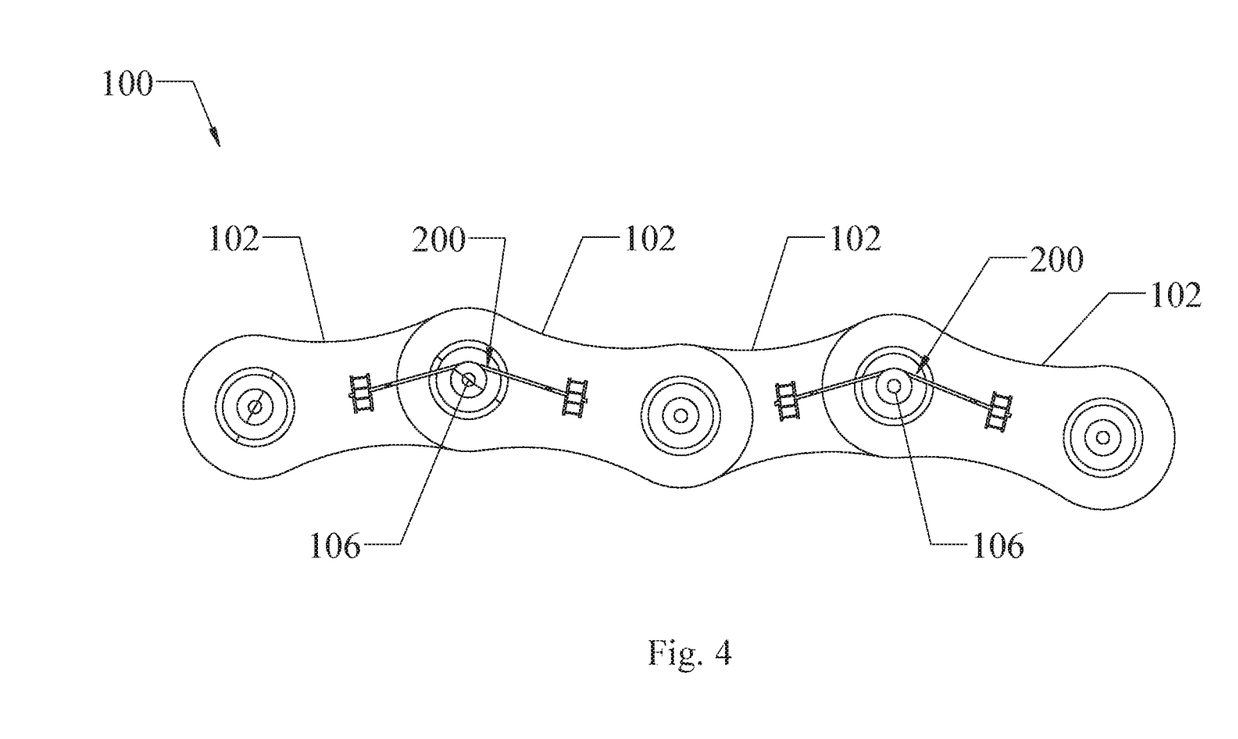
FIG. 4 is a front view of a pair of links of a power transmission chain that includes a torsional spring tensioning system, in accordance with an example embodiment of the present disclosure.
Figure 5:
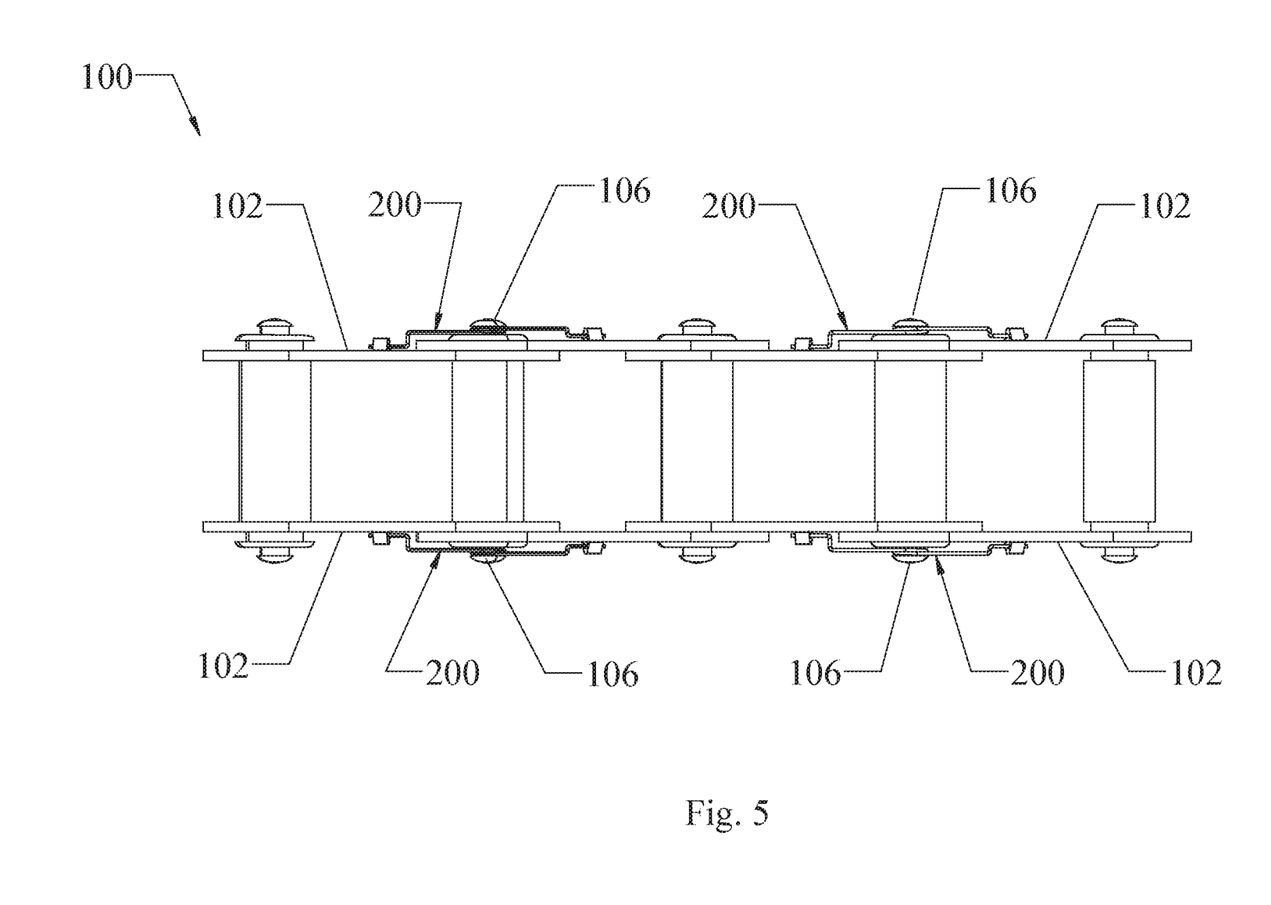
FIG. 5 is a top view of a power transmission chain that includes a torsional spring tensioning system, in accordance with an example embodiment of the present disclosure.

As shown in FIGS. 4 and 5, the torsional spring tensioning system may include a plurality of torsional springs 200 distributed among successive pairs of links 102 within the power transmission chain 100. In embodiments, torsional springs 200 may be disposed at each pivot 106, every other pivot 106, or less frequently along the power transmission chain 100. For example, FIGS. 4 and 5 show segments of a power transmission chain 100 that includes torsional springs 200 disposed at every other pivot 106 along the power transmission chain 100. Utilizing a plurality of distributed torsional springs 200 may help to produce or maintain tension more uniformly throughout the power transmission chain 100.

Furthermore, to add stability, torsional springs 200 may be disposed on both sides of the power transmission chain 100. For example, in the embodiment illustrated in FIG. 5, each of the links 102 is connected to torsional springs 200 disposed on opposite sides of the power transmission chain 100. In this regard, a pair of links 102 may have a first torsional spring 200 coupled to connection points 108 on the links 102, on a first side of the power transmission chain 100, and may further have a second torsional spring 200 coupled to connection points 108 on the links 102, on a second (opposite) side of the power transmission chain 100. In other embodiments, the torsional springs 200 may be limited to one side, disposed on opposite sides in a non-overlapping arrangement (e.g., staggered), centrally located, or any combination thereof.

Various embodiments of a power transmission chain 100 that includes a torsional spring tensioning system have been described with reference to FIGS. 1 through 6. However, the power transmission chain 100 may be modified without deviating from the scope of this disclosure. For example, any of the components (e.g., links 102, rollers 104, pins 106, connection points 108, torsional springs 200, windings 202, spring legs 204, etc.) described herein may be implemented by a plurality of components. In this regard, any reference to "a" or "the" component should be understood as a reference to "one or more" of the same component.

Although the technology has been described with reference to the embodiments illustrated in the attached drawing figures, equivalents may be employed and substitutions made herein without departing from the scope of the technology as recited in the claims. Components illustrated and described herein are merely examples of a device and components that may be used to implement the embodiments of the present invention and may be replaced with other devices and components without departing from the scope of the invention. Furthermore, any dimensions, degrees, and/or numerical ranges provided herein are to be understood as non-limiting examples unless otherwise specified in the claims.

What is claimed is:

1. A torsional spring tensioning system for a power transmission chain, comprising:
   an outer link of the power transmission chain;
   an inner link of the power transmission chain;
   a pivot connecting the inner link to the outer link; and
   a torsional spring including a first spring leg and a second spring leg flexibly coupled by at least one winding, wherein the at least one winding is coupled to the pivot, the first spring leg is coupled to the inner link, and the second spring leg is coupled to the outer link.

2. The torsional spring tensioning system of claim 1, wherein the first spring leg, the second spring leg, and the at least one winding are part of a common structure.

3. The torsional spring tensioning system of claim 1, wherein the torsional spring is formed from a metal or a metal alloy.

4. The torsional spring tensioning system of claim 1, wherein the inner link includes a first connection point configured to receive a first end portion of the first spring leg, and the outer link includes a second connection point configured to receive a second end portion of the second spring leg.

5. The torsional spring tensioning system of claim 4, wherein the first connection point is located at or past a midpoint of the inner link, and the second connection point is located at or past a midpoint of the outer link.

6. The torsional spring tensioning system of claim 4, wherein the first and second connection points comprise notches, slots, indentations, projections, openings, or holes on the inner and outer links.

7. The torsional spring tensioning system of claim 4, wherein the first spring leg includes at least one bend between the at least one winding and the first end portion based on surface height or depth differences between the pivot and the first connection point on the inner link.

8. The torsional spring tensioning system of claim 4, wherein the second spring leg includes at least one bend between the at least one winding and the second end portion based on surface height or depth differences between the pivot and the second connection point on the outer link.

9. The torsional spring tensioning system of claim 1, wherein the pivot comprises a pin configured to hold the inner link, the outer link, and the torsional spring together, wherein the pin is configured to extend through the at least one winding of the torsional spring.

10. The torsional spring tensioning system of claim 1, further comprising:
    a second torsional spring coupled to the inner and outer links, wherein the torsional spring and the second torsional spring are disposed on opposite sides of the power transmission chain.

11. A power transmission chain, comprising:
    a plurality of links pivotally coupled to one another; and
    a torsional spring tensioning system for the plurality of links, the torsional spring tensioning system including a plurality of torsion springs, wherein each of the torsion springs includes a first spring leg and a second spring leg flexibly coupled by at least one winding, wherein the at least one winding is coupled to a pivot that connects a pair of links, the first spring leg is coupled to an inner link of the pair of links, and the second spring leg is coupled to an outer link of the pair of links.

12. The power transmission chain of claim 11, wherein the first spring leg, the second spring leg, and the at least one winding are part of a common structure.

13. The power transmission chain of claim 11, wherein each of the torsional springs is formed from a metal or a metal alloy.

14. The power transmission chain of claim 11, wherein the inner link includes a first connection point configured to receive a first end portion of the first spring leg, and the outer link includes a second connection point configured to receive a second end portion of the second spring leg.

15. The power transmission chain of claim 14, wherein the first connection point is located at or past a midpoint of the inner link, and the second connection point is located at or past a midpoint of the outer link.

16. The power transmission chain of claim 14, wherein the first and second connection points comprise notches, slots, indentations, projections, openings, or holes on the inner and outer links.

17. The power transmission chain of claim 14, wherein the first spring leg includes at least one bend between the at least one winding and the first end portion based on surface height or depth differences between the pivot and the first connection point on the inner link.

18. The power transmission chain of claim 14, wherein the second spring leg includes at least one bend between the at least one winding and the second end portion based on surface height or depth differences between the pivot and the second connection point on the outer link.

19. The power transmission chain of claim 11, wherein the torsional springs are disposed at every other pivot or less frequently along the power transmission chain.

20. The power transmission chain of claim 11, wherein the plurality of torsional springs includes a first plurality of torsional springs and a second plurality of torsional springs disposed on opposite sides of the power transmission chain.

* * * * *